(12) United States Patent
Wu (10) Patent No.: US 11,133,981 B2
(45) Date of Patent: Sep. 28, 2021

(54) DEVICE AND METHOD OF HANDLING A DATA RADIO BEARER

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 291 days.

(21) Appl. No.: 16/261,596

(22) Filed: Jan. 30, 2019

(65) Prior Publication Data

US 2019/0245738 A1 Aug. 8, 2019

Related U.S. Application Data

(60) Provisional application No. 62/628,260, filed on Feb. 8, 2018.

(51) Int. Cl.
*H04L 12/24* (2006.01)
*H04W 76/27* (2018.01)
*H04W 76/30* (2018.01)
*H04W 76/10* (2018.01)
*H04W 24/00* (2009.01)

(52) U.S. Cl.
CPC .............. *H04L 41/08* (2013.01); *H04W 24/00* (2013.01); *H04W 76/10* (2018.02); *H04W 76/27* (2018.02); *H04W 76/30* (2018.02)

(58) Field of Classification Search
CPC ........ H04L 41/08; H04L 61/00; H04W 24/02; H04W 76/30; H04W 76/27; H04W 76/10; H04W 24/00
See application file for complete search history.

(56) References Cited

U.S. PATENT DOCUMENTS

| 2014/0308953 A1* | 10/2014 | Park | H04W 36/165 455/436 |
| 2016/0029361 A1* | 1/2016 | Lu | H04L 61/6022 370/329 |
| 2016/0135095 A1* | 5/2016 | Wu | H04W 36/0061 370/328 |

OTHER PUBLICATIONS

3GPP TS 36.331 V15.0.1, Jan. 2018.
3GPP TS 37.340 V15.0.0, Dec. 2017.
3GPP TS 38.331 V15.0.0, Dec. 2017.

* cited by examiner

*Primary Examiner* — Ian N Moore
*Assistant Examiner* — Brian T Le
(74) *Attorney, Agent, or Firm* — Winston Hsu (57) ABSTRACT

A first network node of a first radio access technology (RAT) handling a data radio bearer (DRB) for establishing a connection to a communication device; transmitting a first plurality of configurations of the first RAT, a first DRB configuration of the first RAT and a second DRB configuration of a second RAT, to the communication device via the connection, to configure a DRB, wherein the first DRB configuration and the second DRB configuration comprise a DRB identity identifying the DRB and the first plurality of configurations are associated to the first DRB configuration; and transmitting a first DRB release configuration of the first RAT and a second DRB release configuration of the second RAT to the communication device via the connection, to release the DRB, wherein the first DRB release configuration and the second DRB release configuration comprise the DRB identity.

11 Claims, 7 Drawing Sheets

DEVICE AND METHOD OF HANDLING A DATA RADIO BEARER

CROSS REFERENCE TO RELATED APPLICATIONS

This application claims the benefit of U.S. Provisional Application No. 62/628,260, filed on Feb. 8, 2018, which is incorporated herein by reference.

BACKGROUND OF THE INVENTION

1. Field of the Invention

The present invention relates to a device and a method used in a wireless communication system, and more particularly, to a device and a method of handling a data radio bearer.

2. Description of the Prior Art

A user equipment (UE) simultaneously communicates with a master node (MN) and a secondary node (SN), to realize a dual connectivity (DC). In the DC, the UE uses a MN configuration(s) and/or a SN configuration(s) to communicate data associated to a data radio bearer (DRB) with the MN and/or the SN.

SUMMARY OF THE INVENTION

The present invention therefore provides a communication device and method for handling a data radio bearer to solve the abovementioned problem.

A first network node of a first radio access technology (RAT) for handling a data radio bearer (DRB) comprises at least one storage device and at least one processing circuit coupled to the at least one storage device. The at least one storage device stores, and the at least one processing circuit is configured to execute instructions of establishing a connection to a communication device; transmitting a first plurality of configurations of the first RAT, a first DRB configuration of the first RAT and a second DRB configuration of a second RAT, to the communication device via the connection, to configure a DRB, wherein the first DRB configuration and the second DRB configuration comprise a DRB identity identifying the DRB and the first plurality of configurations are associated to the first DRB configuration; and transmitting a first DRB release configuration of the first RAT and a second DRB release configuration of the second RAT to the communication device via the connection, to release the DRB, wherein the first DRB release configuration and the second DRB release configuration comprise the DRB identity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
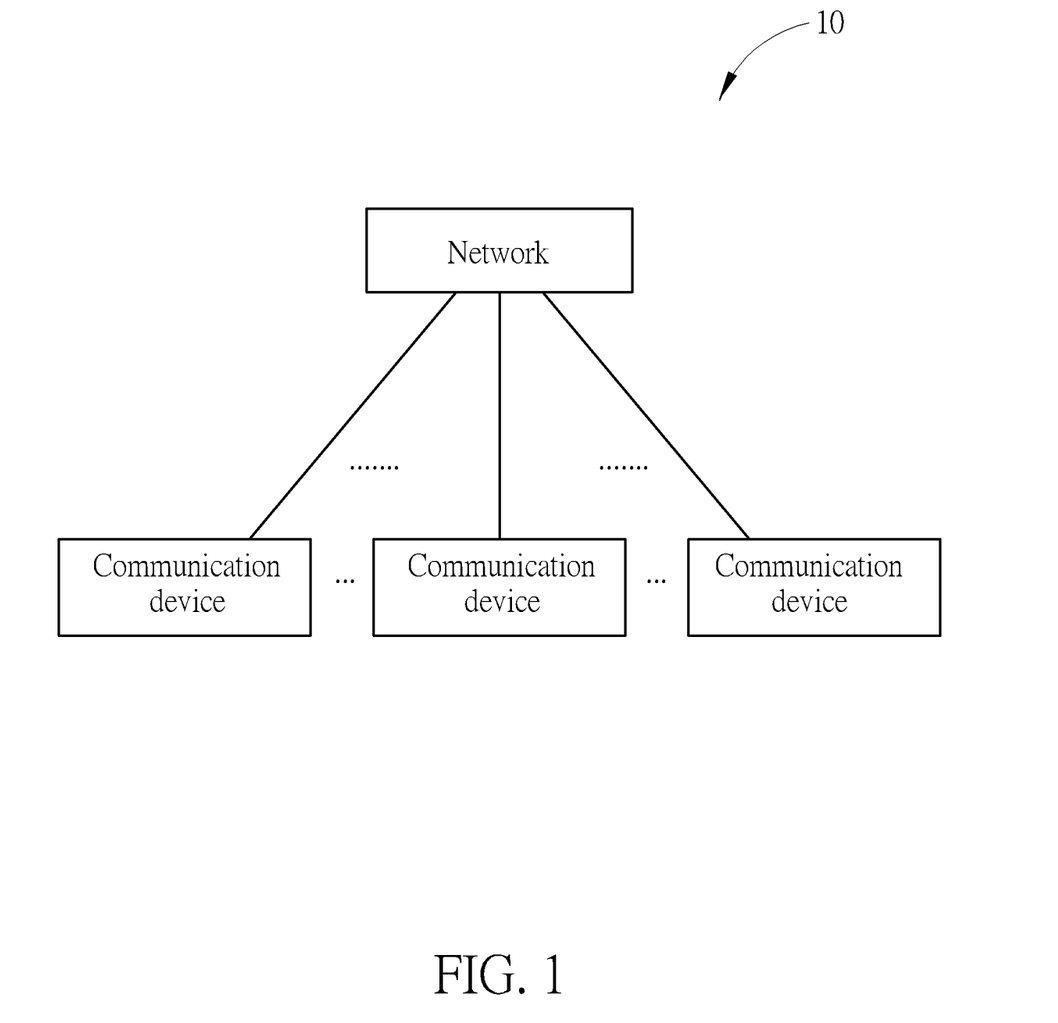
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and the communication device may communicate with each other via one or multiple cells (e.g., one or multiple carriers) belonging to one or multiple base stations (BSs).

In FIG. 1, the network and the communication devices are simply utilized for illustrating the structure of the wireless communication system 10. Practically, the network includes an evolved universal terrestrial radio access network (E-UTRAN) including at least one evolved Node-B (eNB) and a fifth generation (5G) network including at least one 5G BS (e.g., gNB) to communicate with the communication devices.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
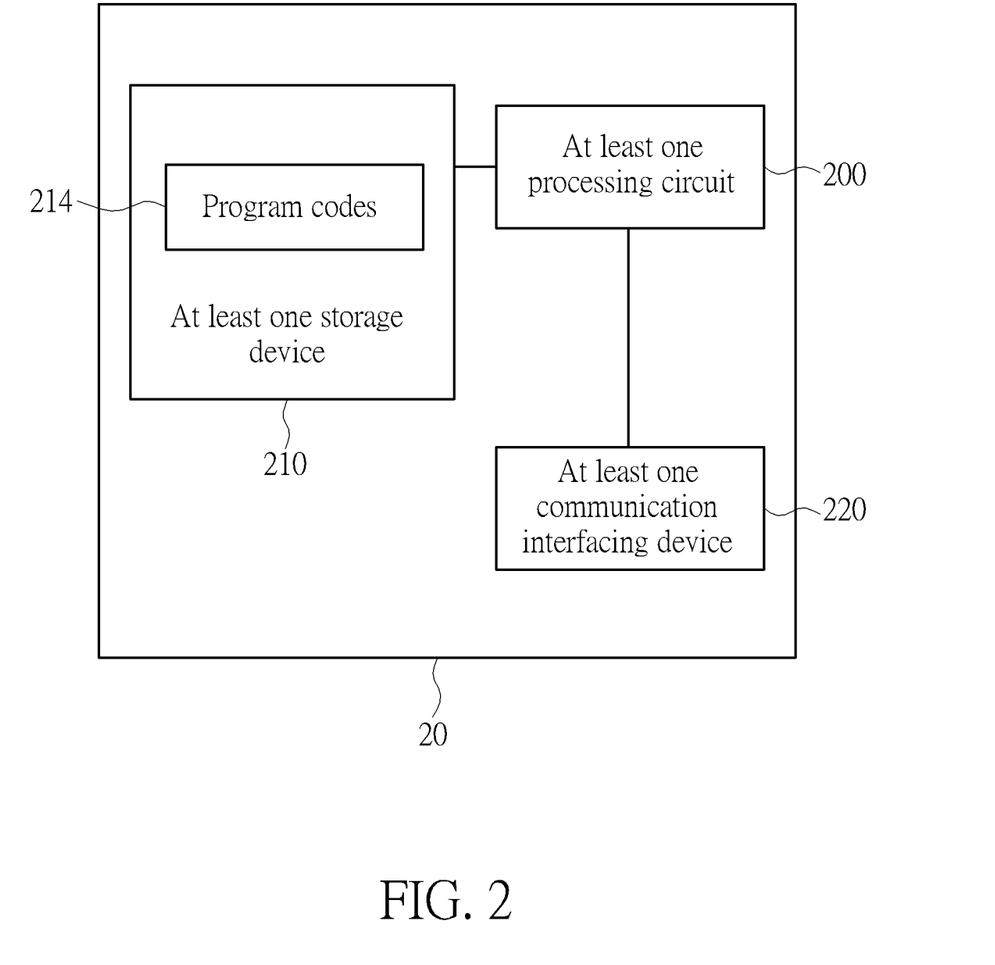
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

The DC may be a multi-radio access technology (RAT) DC (MR-DC) which can be an Evolved Universal Terrestrial Radio Access (EUTRA)-NR DC (EN-DC), a next-generation EN-DC (NGEN-DC) or a NR-EUTRA DC (NE-DC). In the EN-DC, the MN is an eNB (i.e., Master eNB), and the SN is a gNB (i.e., Secondary gNB (SgNB)). In the NGEN-DC, the MN is a next-generation eNB (ng-eNB), and the SN is a SgNB. In the NE-DC, the MN is a gNB (i.e., Master gNB), and the SN is an eNB (i.e., Secondary eNB) which may be a ng-eNB.

In the following examples, a UE is used for representing a communication device in FIG. 1, to simplify the illustration of the embodiments. The MR-DC refers to an EN-DC, a NGEN-DC or a NE-DC.

Figure 3:
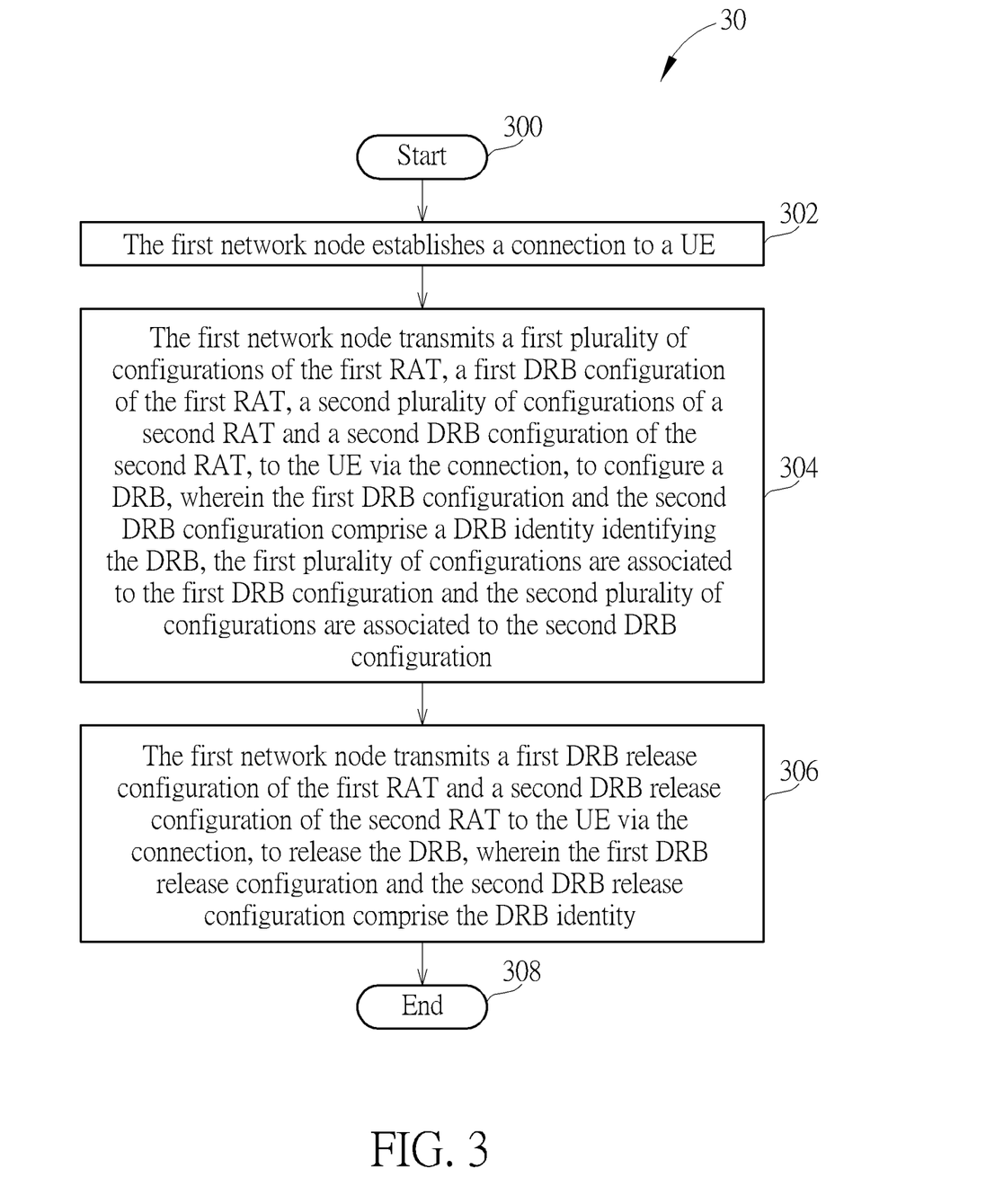
FIG. 3 is a flowchart of a process according to an example of the present invention.

A process 30 in FIG. 3 is utilized in a first network node (e.g., MN) of a first RAT, and includes the following steps:

Step 300: Start.

Step 302: The first network node establishes a connection to a UE.

Step 304: The first network node transmits a first plurality of configurations of the first RAT, a first DRB configuration of the first RAT, a second plurality of configurations of a second RAT and a second DRB configuration of the second RAT, to the UE via the connection, to configure a DRB (e.g., for the MR-DC), wherein the first DRB configuration and the second DRB configuration comprise a DRB identity identifying the DRB, the first plurality of configurations are associated to the first DRB configuration and the second plurality of configurations are associated to the second DRB configuration.

Step 306: The first network node transmits a first DRB release configuration of the first RAT and a second DRB release configuration of the second RAT to the UE via the connection, to release the DRB, wherein the first DRB release configuration and the second DRB release configuration comprise the DRB identity.

Step 308: End.

According to the process 30, the first network node can release the DRB configured by the first DRB configuration and the second DRB configuration. Without the process 30, it is not clear how to release the DRB. Thus, the process 30 solves a problem that the first network node fails to release the DRB.

In one example, the connection includes a signalling radio bearer (SRB) or a radio resource control (RRC) connection, of the first RAT. The DRB may be a split bearer.

In one example, the first network node communicates (i.e., transmit or receive) data associated to the DRB with (i.e., to or from) the UE according to the first plurality of configurations or the first DRB configuration, before releasing the DRB. A second network node (e.g., SN) communicates data associated to the DRB with the UE according to the second plurality of configurations or the second DRB configuration, before releasing the DRB. When releasing the DRB, the UE does not communicate data associated to the DRB with the first network node and the second network node. When releasing the DRB, the first network node and the second network node do not communicate data associated to the DRB with the UE.

In one example, the first plurality of configurations, the second plurality of configurations, the first DRB configuration and the second DRB configuration are included in at least one first message transmitted by the first network node to the UE. The first network node receives a first response message in response to the at least one first message. In one example, the first plurality of configurations includes at least one of a radio link control (RLC) configuration, a logical channel (LC) identity and a LC configuration. In one example, the second plurality of configurations includes at least one of a RLC configuration, a LC identity and a LC configuration.

In one example, the first network node transmits a second message including the first DRB release configuration and the second DRB release configuration to the UE via the connection. The UE transmits a second response message to the first network node in response to the second message.

In one example, the first network node transmits the first DRB release configuration to the UE via the connection, but does not transmit the second DRB release configuration of the second RAT to the UE, in order to release the first plurality of configurations. For example, the first network node transmits to the UE a third message including the first DRB release configuration and not including the second DRB release configuration, instead of transmitting the second message. The UE transmits a third response message to the first network node in response to the third message. The UE releases the first plurality of configurations and keeps the second plurality of configurations and the second DRB configuration, in response to the first DRB release configuration. The first network node releases the first plurality of configurations and the first DRB configuration and keeps the second plurality of configurations and the second DRB configuration, when transmitting the third message to the UE. The second network node may communicate data associated to the DRB with the UE according to the second plurality of configurations and the second DRB configuration, when the first plurality of configurations and the first DRB configuration are released.

In one example, the first RAT is a EUTRA, and the second RAT is a new radio (NR). The first network node is a Master eNB (MeNB) or a Master ng-eNB (Mng-eNB), and the second network node is a SgNB. Any of the at least one first message may be a RRC Connection Reconfiguration message. The second message and the third message may be RRC Connection Reconfiguration messages. The first response message, the second response message and the third response message may be RRC Connection Reconfiguration Complete messages. In one example, the first plurality of configurations are included in the first DRB configuration, and the first DRB configuration is a DRB-ToAddMod information element (IE). In one example, the second DRB configuration is a DRB-ToAddMod IE. In one example, the second plurality of configurations are defined in a LCH-Config or a RLC-Bearer-Config IE.

In one example, the first RAT is the NR, and the second RAT is the EUTRA. The first network node is a Master gNB (MgNB), and the second network node is a Secondary ng-eNB (Sng-eNB). Any of the at least one first message may be a RRC Reconfiguration message. The first response message may be a RRC Reconfiguration Complete message. In one example, the second plurality of configurations are included in the second DRB configuration, and the second DRB configuration is a DRB-ToAddMod IE. In one example, the first DRB configuration is a DRB-ToAddMod IE. In one example, the first plurality of configurations is defined in a LCH-Config or a RLC-Bearer-Config IE.

In one example, in response to the first DRB release configuration and the second DRB release configuration, the UE releases the DRB. In one example, the first DRB release configuration is included in a DRB-ToReleaseList IE, and the second DRB release configuration is included in a DRB-ToReleaseList IE.

In one example, the data associated to the DRB include at least one Packet Data Convergence Protocol (PDCP) Protocol Data Unit (PDU). The second DRB configuration includes a PDCP configuration. The UE communicates the at least one PDCP PDU with the first network node or the second network node, according to the PDCP configuration. The PDCP configuration may be a PDCP-Config IE. The first network node or the second network node communicates the at least one PDCP PDU with the UE, according to the PDCP configuration. In one example, the PDCP configuration is a PDCP-Config IE.

Figure 4:
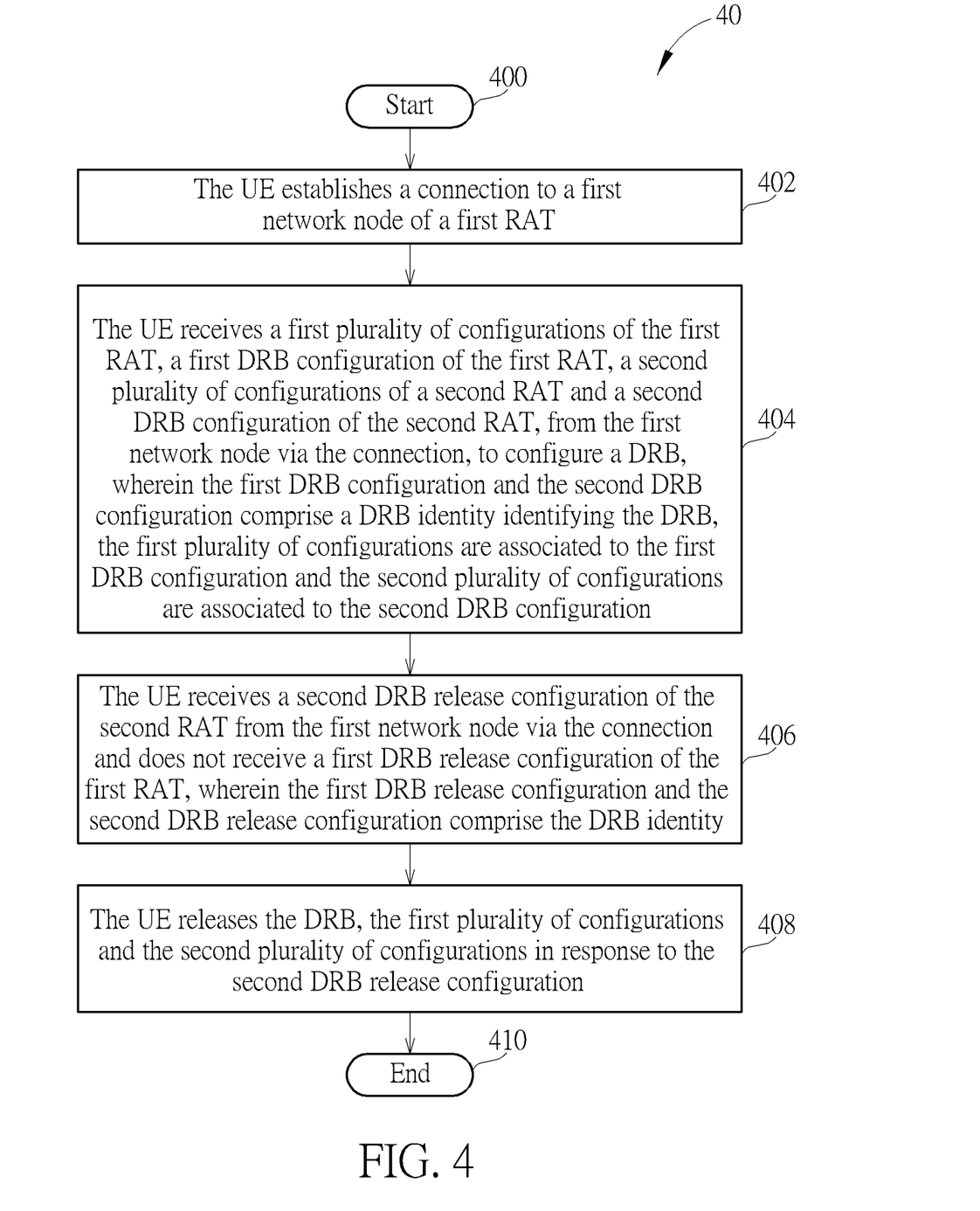
FIG. 4 is a flowchart of a process according to an example of the present invention.

A process 40 in FIG. 4 is utilized in a UE, and includes the following steps:

Step 400: Start.

Step 402: The UE establishes a connection to a first network node of a first RAT.

Step 404: The UE receives a first plurality of configurations of the first RAT, a first DRB configuration of the first RAT, a second plurality of configurations of a second RAT and a second DRB configuration of the second RAT, from the first network node via the connection, to configure a DRB, wherein the first DRB configuration and the second DRB configuration comprise a DRB identity identifying the DRB, the first plurality of configurations are associated to the first DRB configuration and the second plurality of configurations are associated to the second DRB configuration.

Step 406: The UE receives a second DRB release configuration of the second RAT from the first network node via the connection and does not receive a first DRB release configuration of the first RAT, wherein the first DRB release configuration and the second DRB release configuration comprise the DRB identity.

Step 408: The UE releases the DRB, the first plurality of configurations and the second plurality of configurations in response to the second DRB release configuration.

Step 410: End.

According to the process 40, the UE can release the DRB configured by the first DRB configuration and the second DRB configuration. Without the process 40, it is not clear how to release the DRB. Thus, the process 40 solves a problem that the UE fails to release the DRB.

According to the process 40, the UE releases the DRB according to the second DRB release configuration, even if the UE does not receive the first DRB release configuration. Thus, the UE does not communicate data associated to the DRB with the first network node and the second network node, when the DRB is released. The first network node and the second network node do not communicate data via the DRB with the UE, when the DRB is released.

In one example, the UE does not release the DRB, when receiving the first DRB release configuration and not receiving the second DRB release configuration. The UE releases the first plurality of configurations in response to the first DRB release configuration. Details can be referred to the examples of the process 30.

The examples of the process 30 may be applied to the process 40, and are not narrated herein. The following examples may be applied to the process 30-40.

In one example, the first network node includes a LC identity in the second plurality of configurations, and transmits to the UE a LC identity in a rlc-BearerToReleaseList field/IE, to release the second plurality of configurations. The UE releases the second plurality of configurations in response to the LC identity in the rlc-BearerToReleaseList field/IE. In one example, the first network node transmits a fourth message including the rlc-BearerToReleaseList field/IE and not including the first DRB release configuration and the second DRB release configuration, via the connection. The UE keeps the DRB (i.e., the first DRB configuration and the second DRB configuration) and the first plurality of configurations and releases the second plurality of configurations, according to the fourth message. The UE communicates data associated to the DRB with the first network node according to the first plurality of configurations, when the second plurality of configurations are released. The first network node communicates data associated to the DRB with the UE according to the first plurality of configurations and the second DRB configuration, when the second plurality of configurations are released. The UE transmits a fourth response message to the first network node via the connection, in response to the fourth message.

In one example, the fourth message is a RRC Connection Reconfiguration message, the fourth response message is a RRC Connection Reconfiguration message, and the first network node is a MeNB or a Mng-eNB. In one example, the fourth message is a RRC Reconfiguration message, the fourth response message is a RRC Reconfiguration message, and the first network node is a MgNB.

Figure 5:
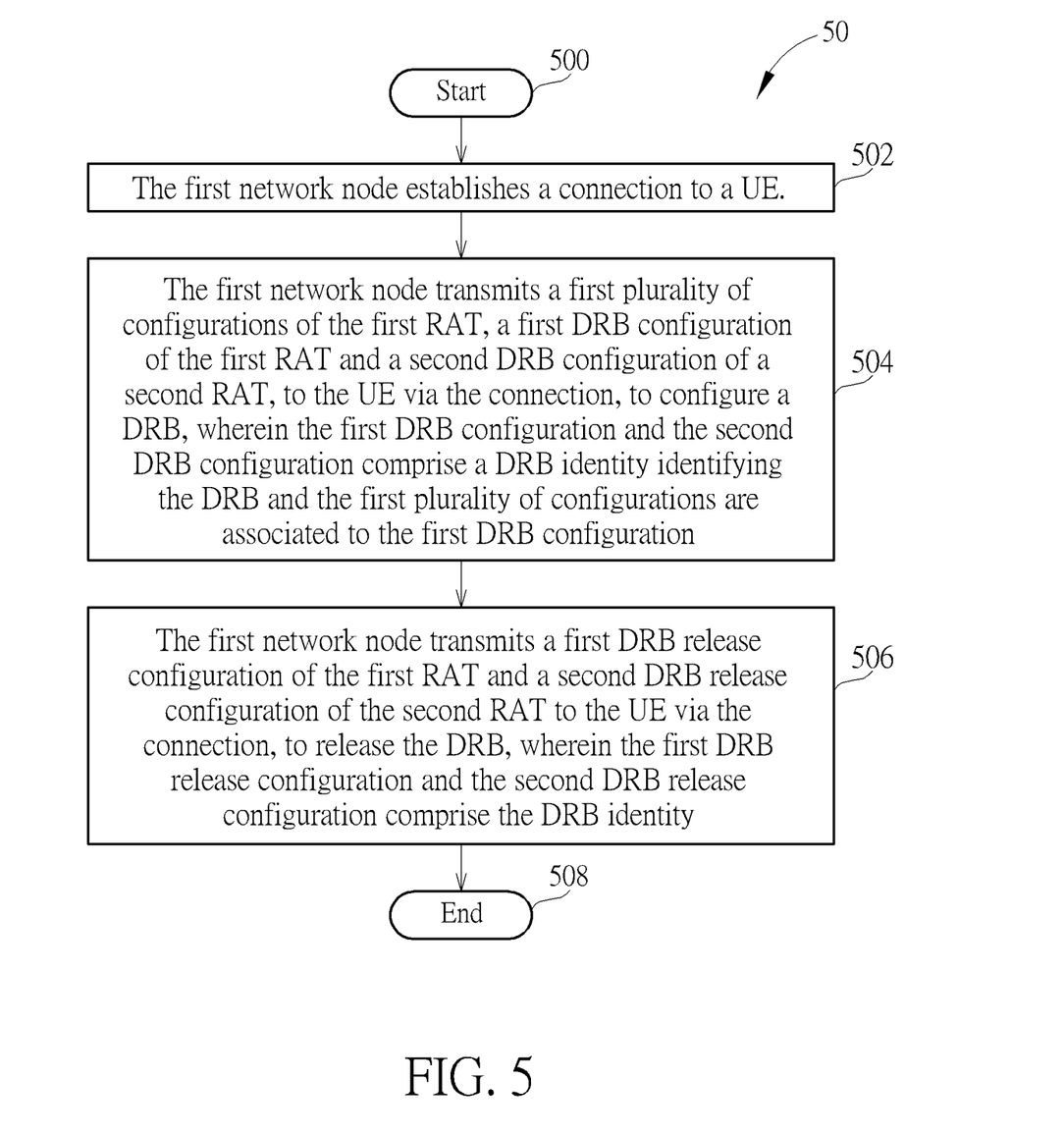
FIG. 5 is a flowchart of a process according to an example of the present invention.

A process 50 in FIG. 5 is utilized in a first network node (e.g., MN) of a first RAT, and includes the following steps:

Step 500: Start.

Step 502: The first network node establishes a connection to a UE.

Step 504: The first network node transmits a first plurality of configurations of the first RAT, a first DRB configuration of the first RAT and a second DRB configuration of a second RAT, to the UE via the connection, to configure a DRB, wherein the first DRB configuration and the second DRB configuration comprise a DRB identity identifying the DRB and the first plurality of configurations are associated to the first DRB configuration.

Step 506: The first network node transmits a first DRB release configuration of the first RAT and a second DRB release configuration of the second RAT to the UE via the connection, to release the DRB, wherein the first DRB release configuration and the second DRB release configuration comprise the DRB identity.

Step 508: End.

A According to the process 50, the first network node can release the DRB configured by the first DRB configuration and the second DRB configuration. Without the process 50, it is not clear how to release the DRB. Thus, the process 50 solves a problem that the first network node fails to release the DRB.

The examples of the process 30 may be applied to the process 50 by removing the description related to the second plurality of configurations, and are not narrated herein.

Figure 6:
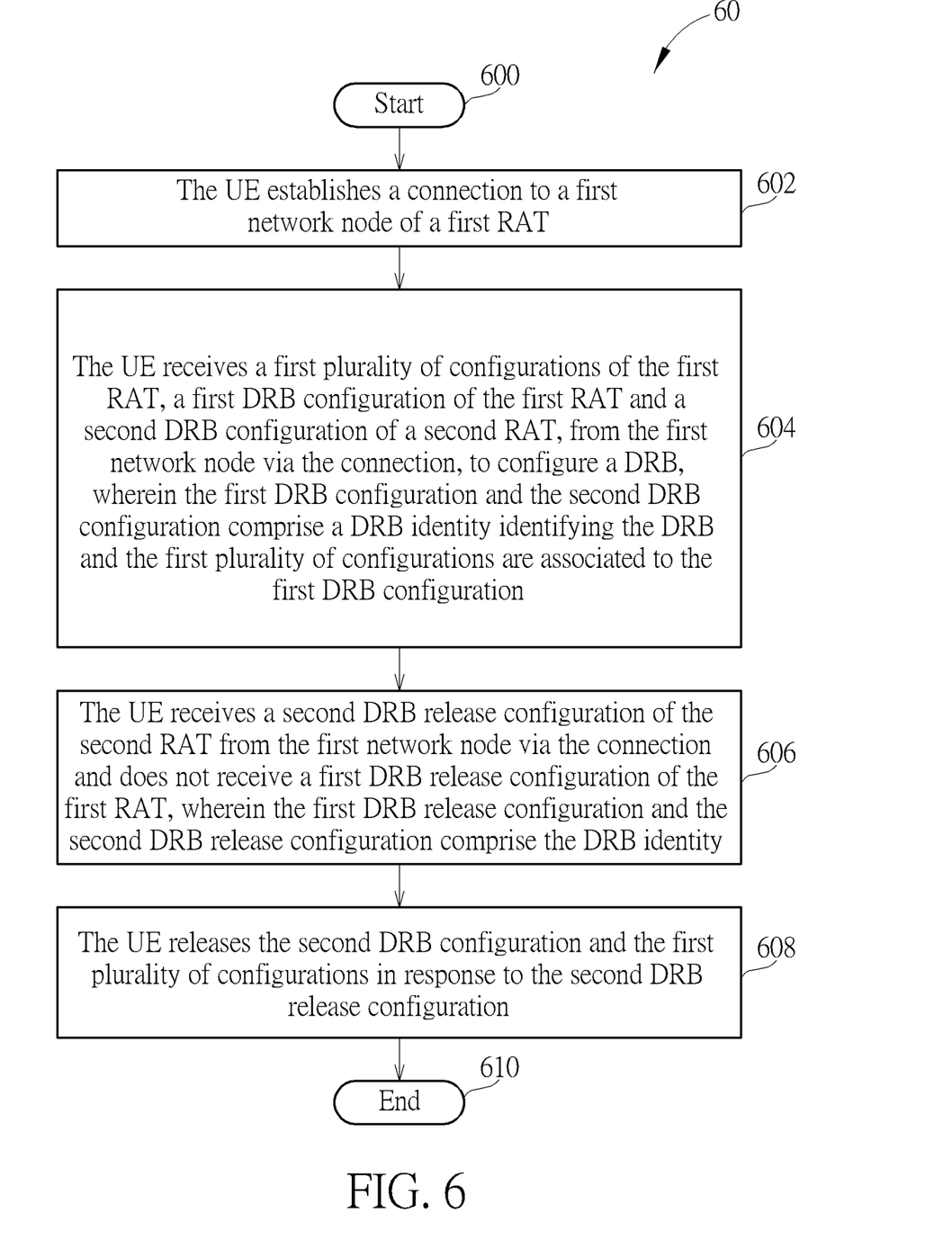
FIG. 6 is a flowchart of a process according to an example of the present invention.

A process 60 in FIG. 6 is utilized in a UE, and includes the following steps:

Step 600: Start.

Step 602: The UE establishes a connection to a first network node of a first RAT.

Step 604: The UE receives a first plurality of configurations of the first RAT, a first DRB configuration of the first RAT and a second DRB configuration of a second RAT, from the first network node via the connection, to configure a DRB, wherein the first DRB configuration and the second DRB configuration comprise a DRB identity identifying the DRB and the first plurality of configurations are associated to the first DRB configuration.

Step 606: The UE receives a second DRB release configuration of the second RAT from the first network node via the connection and does not receive a first DRB release configuration of the first RAT, wherein the first DRB release configuration and the second DRB release configuration comprise the DRB identity.

Step 608: The UE releases the second DRB configuration and the first plurality of configurations in response to the second DRB release configuration.

Step 610: End.

According to the process 60, the UE can release the DRB configured by the first DRB configuration and the second DRB configuration. Without the process 60, it is not clear how to release the DRB. Thus, the process 60 solves a problem that the UE fails to release the DRB.

According to the process 60, the UE does not communicate data associated to the DRB with the first network node, when the second DRB configuration is released.

The examples of the processes 30-40 may be applied to the process 60 by removing the description related to the second plurality of configurations, and are not narrated herein.

Figure 7:
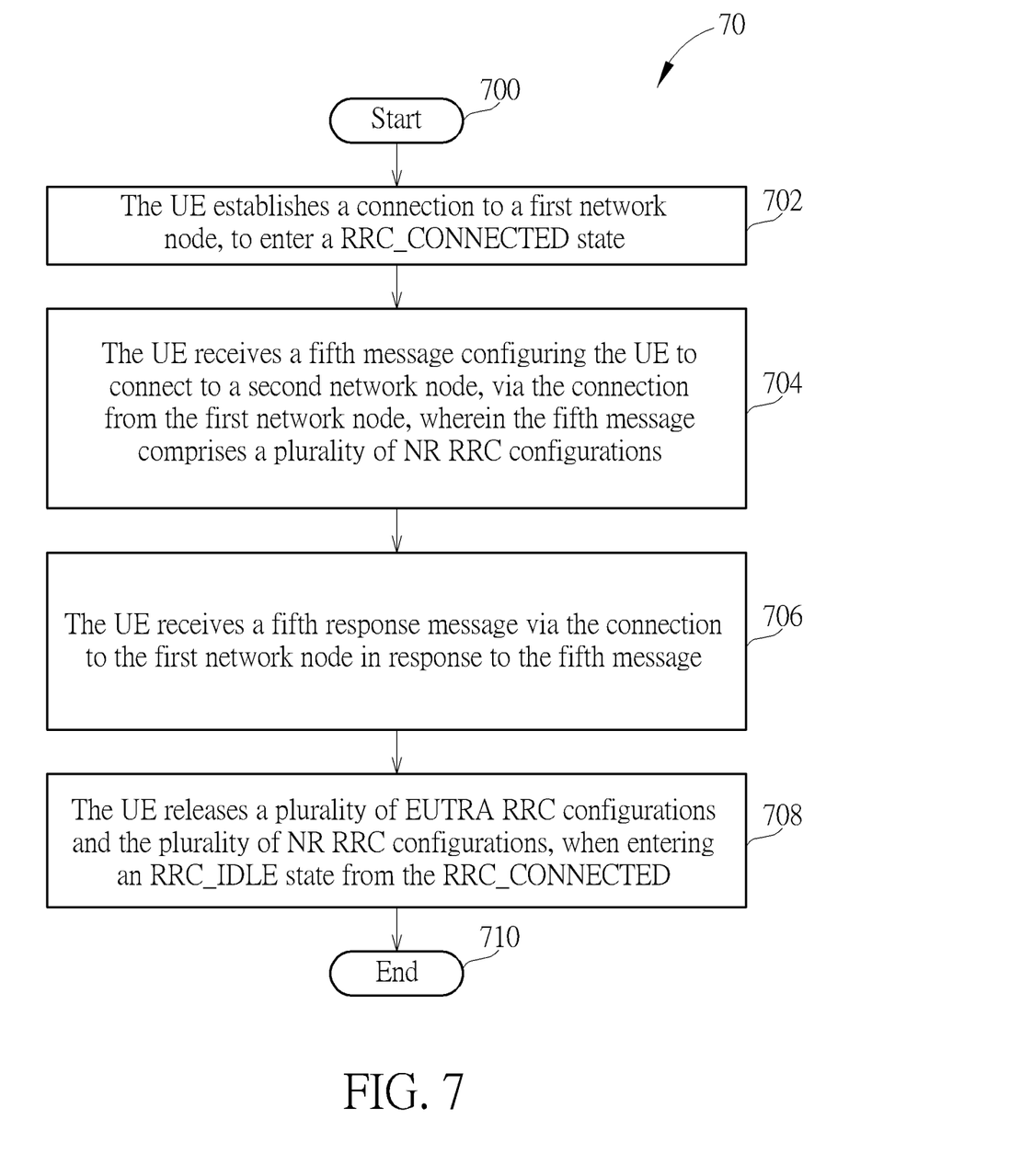
FIG. 7 is a flowchart of a process according to an example of the present invention.

A process 70 in FIG. 7 is utilized in a UE, and includes the following steps:

Step 700: Start.

Step 702: The UE establishes a connection to a first network node, to enter a RRC_CONNECTED state.

Step 704: The UE receives a fifth message configuring the UE to connect to a second network node, via the connection from the first network node, wherein the fifth message comprises a plurality of NR RRC configurations.

Step 706: The UE receives a fifth response message via the connection to the first network node in response to the fifth message.

Step 708: The UE releases a plurality of EUTRA RRC configurations and the plurality of NR RRC configurations, when entering an RRC_IDLE state from the RRC_CONNECTED.

Step 710: End.

According to the process 70, the UE can release the plurality of EUTRA RRC configurations and the plurality of NR RRC configurations upon transitioning from the RRC_CONNECTED state to an RRC_IDLE state. Without the process 70, it is not clear how to release EUTRA and NR configurations. Thus, the process 70 solves a problem that the UE fails to release the plurality of ETURA RRC configurations and the plurality of NR RRC configurations.

In one example, the UE receives the plurality of ETURA RRC configurations from the first network node via the connection or during the establishment of the connection.

The examples of the processes 30-60 may be applied to the process 70, and are not narrated herein. The following examples may be applied to the process 70.

In one example, the plurality of ETURA RRC configurations include physical layer configurations (e.g., related to a Physical DL Control Channel (PDCCH), a Physical UL Control Channel (PUCCH), a Physical DL Shared Channel (PDSCH), a Channel Quality Index (CQI) reporting, a Sounding Reference Signal (SRS) configuration and/or a Multi-input Multi-output (MIMO) configuration), a Medium Access Control (MAC) configuration (e.g., MAC-MainConfig IE), a measurement configuration (e.g., MeasConfig IE) and a SRB configuration (e.g., SRB-ToAddMod IE) and a DRB configuration (e.g., DRB-ToAddMod IE). In one example, the DRB configuration includes a RLC configuration, a LC identity and a LC configuration.

In one example, the plurality of NR RRC configurations include physical layer configurations (e.g., related to a PUCCH, a PDSCH, a channel state information-reference signal (CSI-RS) reporting, a SRS configuration and/or a MIMO configuration), a MAC configuration (e.g., MAC-CellGroupConfig IE), a measurement configuration (e.g., MeasConfig IE) and a SRB configuration (e.g., SRB-ToAddMod IE) and a DRB configuration (e.g., DRB-ToAddMod IE). In one example, the DRB configuration includes a RLC configuration, a LC identity and a LC configuration.

In one example, the UE resets a EUTRA MAC and a NR MAC, when entering the RRC_IDLE state from the RRC_CONNECTED.

In one example, the UE stops at least one first ETURA RRC timer and at least one NR RRC timer, when entering the RRC_IDLE state from the RRC_CONNECTED. In one example, the UE continues a second ETURA RRC timer, when entering the RRC_IDLE state from the RRC_CONNECTED.

In one example, the UE releases all radio resources (e.g., releasing RLC entities, the MAC configuration and associated PDCP entities for all established RBs using an EUTRA PDCP and a NR PDCP), when entering the RRC_IDLE state from the RRC_CONNECTED.

In one example, the UE releases a EUTRA security context and a NR security context, when entering the RRC_IDLE state from the RRC_CONNECTED.

The following examples may be applied to the processes 30-70.

In one example, "not communicate data associated to the DRB" represents "data is not transmitted or received via the DRB".

In one example, the first network node releases the first plurality of configuration and the second plurality of configuration (if configured), when the DRB is released. The first network node or the second network node releases the PDCP configuration in the second DRB configuration in response to the second DRB release configuration. In one example, the UE releases the first plurality of configuration and the second plurality of configuration (if configured), when the DRB is released. The UE releases the PDCP configuration in the second DRB configuration, when the DRB is released. The configurations above are no longer valid, once these configurations are released.

It should be noted that although the above examples are illustrated to clarify the related operations of corresponding processes, the processes and examples can be combined and/or modified arbitrarily according to system requirements and/or design considerations. Message names and IE names described above are examples, but are not limited herein.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for handling a DRB. A network node or a communication device releases or keeps the DRB according to a DRB release configuration. Thus, the problem of handling the DRB is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first network node of a first radio access technology (RAT) for handling a data radio bearer (DRB), comprising:
at least one storage device; and
at least one processing circuit, coupled to the at least one storage device, wherein the at least one storage device stores, and the at least one processing circuit is configured to execute instructions of:
establishing a connection to a communication device;
transmitting a first plurality of configurations of the first RAT, a first DRB configuration of the first RAT and a second DRB configuration of a second RAT, to the communication device via the connection, to configure a DRB, wherein the first DRB configuration and the second DRB configuration comprise a DRB identity identifying the DRB and the first plurality of configurations are associated to the first DRB configuration; and
transmitting a first DRB release configuration of the first RAT and a second DRB release configuration of the second RAT to the communication device via the connection, to release the DRB, wherein the first DRB release configuration and the second DRB release configuration comprise the DRB identity.

2. The first network node of claim 1, wherein the instructions further comprise:
transmitting a second plurality of configurations of the second RAT to the communication device via the connection, wherein the second plurality of configurations are associated to the second DRB configuration.

3. The first network node of claim 1, wherein the instructions further comprise:
not communicating data associated to the DRB with the communication device, when releasing the DRB.

4. A communication device for handling a data radio bearer (DRB), comprising:
at least one storage device; and
at least one processing circuit, coupled to the at least one storage device, wherein the at least one storage device stores, and the at least one processing circuit is configured to execute instructions of:
establishing a connection to a first network node of a first radio access technology (RAT);
receiving a first plurality of configurations of the first RAT, a first DRB configuration of the first RAT and a second DRB configuration of a second RAT, from the first network node via the connection, to configure a DRB, wherein the first DRB configuration and the second DRB configuration comprise a DRB identity identifying the DRB and the first plurality of configurations are associated to the first DRB configuration;
receiving a second DRB release configuration of the second RAT from the first network node via the connection and not receiving a first DRB release configuration of the first RAT, wherein the first DRB release configuration and the second DRB release configuration comprise the DRB identity; and
releasing the second DRB configuration and the first plurality of configurations in response to the second DRB release configuration.

5. The communication device of claim 4, wherein the instructions further comprise:
receiving a second plurality of configurations of the second RAT from the first network node via the connection, wherein the second plurality of configurations are associated to the second DRB configuration.

6. The communication device of claim 4, wherein the instructions further comprise:
releasing the DRB according to the second DRB release configuration; and
not communicating data associated to the DRB with the first network node and a second network node of the second RAT, when the DRB is released.

7. The communication device of claim 4, wherein the instructions further comprise:
not releasing the DRB, when receiving the first DRB release configuration and not receiving the second DRB release configuration.

8. A method for handling a data radio bearer (DRB) of a communication device, comprising:
establishing a connection to a first network node of a first radio access technology (RAT);
receiving a first plurality of configurations of the first RAT, a first DRB configuration of the first RAT and a second DRB configuration of a second RAT, from the first network node via the connection, to configure a DRB, wherein the first DRB configuration and the second DRB configuration comprise a DRB identity identifying the DRB and the first plurality of configurations are associated to the first DRB configuration;
receiving a second DRB release configuration of the second RAT from the first network node via the connection and not receiving a first DRB release configuration of the first RAT, wherein the first DRB release configuration and the second DRB release configuration comprise the DRB identity; and
releasing the second DRB configuration and the first plurality of configurations in response to the second DRB release configuration.

9. The method of claim 8, further comprising:
receiving a second plurality of configurations of the second RAT from the first network node via the connection, wherein the second plurality of configurations are associated to the second DRB configuration.

10. The method of claim 8, further comprising:
releasing the DRB according to the second DRB release configuration; and
not communicating data associated to the DRB with the first network node and a second network node of the second RAT, when the DRB is released.

11. The method of claim 8, further comprising:
not releasing the DRB, when receiving the first DRB release configuration and not receiving the second DRB release configuration.

* * * * *